(12) United States Patent
Mace

(10) Patent No.: US 10,301,565 B2
(45) Date of Patent: May 28, 2019

(54) REDUCED TEMPERATURE GAS DEHYDRATION

(71) Applicant: Eguitrans Gathering Holdings, LLC, Pittsburgh, PA (US)

(72) Inventor: Douglas K. Mace, Wexford, PA (US)

(73) Assignee: Equitrans Gathering Holdings, LLC, Pittsburgh, PA (US)

(*) Notice: Subject to any disclaimer, the term of this patent is extended or adjusted under 35 U.S.C. 154(b) by 299 days.

(21) Appl. No.: 15/156,624

(22) Filed: May 17, 2016

(65) Prior Publication Data

US 2017/0335214 A1  Nov. 23, 2017

(51) Int. Cl.
*B01D 53/26* (2006.01)
*C10L 3/10* (2006.01)

(52) U.S. Cl.
CPC .......... *C10L 3/106* (2013.01); *B01D 53/265* (2013.01); *C10L 2290/06* (2013.01); *C10L 2290/08* (2013.01)

(58) Field of Classification Search
CPC .............. B01D 53/265; C10L 2290/06; C10L 2290/08; C10L 3/106
See application file for complete search history.

(56) References Cited

U.S. PATENT DOCUMENTS

2013/0035534 A1* 2/2013 Favilli .................. B01D 53/002
585/812

OTHER PUBLICATIONS

Caltec Technology, Caltec Limited, Medway Court, Cranfield, Bedford, MK43 0FQ, United Kingdom, www.caltec.com/technology, downloaded from the Internet on Apr. 21, 2016.

Fox Valve, Fox Valve Development Corp, Dover, New Jersey, 4 pages, www.foxvalve.com, downloaded from the Internet on May 19, 2016.

Mueller KLS-1C Separator, Mueller Enviornmental Designs, Inc., Brookshire, Texas, 2 pages, www.muellerenvironmental.com, downloaded from the Internet on May 19, 2016.

Northvalekorting specialists in flow control equipment, Northvale Korting Ltd, 2 Uxbridge Road, Leicester LE4 &ST, www.northvalekorting.co.uk/venturi-fluid-jet, downloaded from the Internet on Apr. 21, 2016.

Peco Series 95 SV Scrubber, PECOFacet (US) Inc. of Mineral Wells, Texas, 4 pages, www.perryequipment.com, downloaded from the Internet on May 19, 2016.

Pressure Reducing Valves, Stra-Val, www.straval.com/landing/pressure-reducing-valves/?gclid=cpgerery5swcfu, downloaded from the Internet on May 19, 2016.

* cited by examiner

*Primary Examiner* — Cabrena Holecek
(74) *Attorney, Agent, or Firm* — The Webb Law Firm

(57) ABSTRACT

In a natural gas dehydration system and method, a first stream of natural gas and water vapor having a first pressure and a first temperature is mixed with a second stream of natural gas and water vapor having a second, lower pressure than the first pressure and a second temperature to form a third stream of natural gas and water vapor. The pressure and temperature of the third stream is then reduced and at least part of the water is separated from the third stream to form a fourth stream of natural gas and water vapor having a lower water vapor content than the third stream. In response to a temperature of the third stream being above a predetermined temperature, causing the fourth stream to extract heat from the first stream prior mixing the first and second streams. Then, the fourth stream is flowed to a distribution pipeline or a storage system.

8 Claims, 3 Drawing Sheets

REDUCED TEMPERATURE GAS DEHYDRATION

BACKGROUND OF THE INVENTION

Field of the Invention

The present invention relates to methods and apparatus for dehydrating natural gas and, more particularly, dehydrating natural gas in a way that minimizes or avoids the need to use external energy for the dehydration process.

Description of Related Art

Heretofore, dehydration of natural gas extracted from the ground was accomplished using a TEG (Triethylene Glycol) absorber with a glycol regeneration system. In the absorber (also known as a contact tower), TEG comes in direct contact (counter flow) with the natural gas. Water is absorbed by the TEG from the natural gas. The combination TEG and adsorbed water then enters the regeneration system (also known as a reboiler) where said combination is heated at atmospheric pressure and the water is boiled off. The TEG is then recirculated. The reboiler gives off emissions (in the form of hydrocarbons, volatile organic compounds (VOCs), and other compounds) from due to burning natural gas and from heating the combination TEG and water.

Heretofore, motor driven pumps were also used in the dehydration of natural gas extracted from the ground. These motors utilized either electrical energy from an external electrical source or some of the extracted natural gas to develop the motive power to drive the pumps for the dehydration process. In an example, natural gas or electrical powered motors were utilized to drive compressors utilized in the natural gas dehydration process.

An obvious drawback of using gas or electric powered motor(s) and a reboiler for dehydrating natural gas extracted from the ground is production of undesirable emissions such as, for example, hydrocarbons and VOCs.

SUMMARY OF THE INVENTION

Various preferred and non-limiting examples or aspects of the present invention will now be described and set forth in the following numbered clauses.

Clause 1. A natural gas dehydration method comprising: (a) reducing a pressure and a temperature of a first stream of natural gas and water vapor; (b) separating at least part of the water from the first stream of step (a) to form a second stream of natural gas and water vapor with a lower water vapor content than the first stream; (c) when a temperature of the first stream of step (a) is above a predetermined temperature, causing the second stream to extract heat from the first stream prior to step (a); and (d) following step (c), causing the second stream to flow to a distribution pipeline or a storage system.

Clause 2. The method of clause 1, wherein step (c) can include: when a temperature of the first stream of step (a) is at or below the predetermined temperature, causing at least part of the second stream to flow to the distribution pipeline or the storage system without extracting heat from the first stream prior to step (a).

Clause 3. The method of either clause 1 or 2, wherein the predetermined temperature can be ≤dew point temperature of the water vapor in the first stream of step (a).

Clause 4. The method of any of clauses 1-3, wherein the first stream of step (a) can include a freezing inhibitor.

Clause 5. A natural gas dehydration method comprising: (a) mixing a first stream of natural gas and water vapor at a first pressure and a first temperature with a second stream of natural gas and water vapor at a second, lower pressure than the first pressure and second temperature to form a third stream of natural gas and water vapor; (b) reducing a pressure and a temperature of the third stream of step (a); (c) separating at least part of the water from the third stream of step (b) to form a fourth stream of natural gas and water vapor with a lower water vapor content than the third stream; (d) in response to a temperature of the third stream being above a predetermined temperature, causing the fourth stream to extract heat from the first stream prior to step (a); and (e) following step (e), causing the fourth stream to flow to a distribution pipeline or a storage system.

Clause 6. The method of clause 5, wherein step (d) can include: in response to the temperature of the third stream being at or below the predetermined temperature, causing at least part of the fourth stream to flow to the distribution pipeline or the storage system without extracting heat from the first stream prior to step (a).

Clause 7. The method of either clause 5 or 6, wherein the predetermined temperature can be ≤dew point temperature of the water vapor in the third stream.

Clause 8. The method of any of clauses 5-7, wherein the first stream of step (a) can include a freezing inhibitor.

Clause 9. A natural gas dehydration system comprising: a heat exchanger having a first passage defining a first inlet and a first outlet, and a second passage defining a second inlet and a second outlet, the first and second passages in thermal communication with each other and fluidly isolated from each other, the first inlet is coupled to receive a first stream of natural gas and water vapor at a first temperature and a first pressure; an eductor pump having a first inlet coupled to receive the first stream from the first outlet of the heat exchanger, the eductor pump having a second inlet coupled to receive a second stream of natural gas and water vapor at a second temperature and a second pressure less than the first pressure, the eductor pump operative for combining the first and second streams to form at an outlet of the eductor pump a third stream of natural gas and condensed water and/or water vapor at a third temperature less than the first temperature and a third pressure less than the first pressure; a separator having an inlet coupled to receive the third stream from the outlet of the eductor pump, the separator operative for separating at least part of the water from the third stream to form a fourth stream of natural gas and water vapor that has less water content than the third stream and for outputting the fourth stream via a first outlet of the separator to the second inlet of the heat exchanger, wherein the second outlet of the heat exchanger is coupled to a distribution pipeline or a storage system.

Clause 10. The system of clause 9, wherein the separator can have a second outlet for discharge of water separated from the third stream Clause 11. The system of either clause 9 or 10 can further include: a valve between the second inlet and the second outlet of the heat exchanger; a temperature sensor for sensing the third temperature of the third stream; and a controller operative for controlling the valve to be in an open state for passage of at least part of the fourth stream therethrough or a closed state for blocking passage of the fourth stream therethrough based on the third temperature of the third stream determined via the temperature sensor.

Clause 12. The system of any of clauses 9-11, wherein in response to the controller determining via the temperature sensor that the third temperature of the third stream is above a predetermined temperature, the controller can cause the valve to be in the closed state, whereupon the fourth stream flows through the second passage of the heat exchanger extracting heat from the first stream flowing in the first passage of the heat exchanger.

Clause 13. The system of any of clauses 9-12, wherein in response to the controller determining via the temperature sensor that the third temperature of the third stream is at or below a predetermined temperature, the controller can cause the valve to be in the open state, whereupon at least part of the fourth stream flows through the valve bypassing the second passage of the heat exchanger.

Clause 14. The system of any of clauses 9-13, wherein the first stream can include a freezing inhibitor.

Clause 15. A natural gas dehydration system comprising: a heat exchanger having a first passage defining a first inlet and a first outlet, and second passage defining a second inlet and a second outlet, the first and second passages in thermal communication with each other and fluidly isolated from each other, the first inlet is coupled to receive a first stream of natural gas and water vapor at a first temperature and a first pressure; a pressure reduction valve having an inlet coupled to receive the first stream from the first outlet of the heat exchanger, the pressure reduction valve operative for providing a reduced temperature and reduced pressure first stream at an outlet of the pressure reduction valve; and a separator having an inlet coupled to receive the first stream from the outlet of the pressure reduction valve, the separator operative for separating at least part of the water from the first stream to form a second stream of natural gas and water vapor having a lower water content than the first stream and for outputting the second stream via a first outlet of the separator to the second inlet of the heat exchanger, wherein the second outlet of the heat exchanger is coupled to a distribution pipeline or a storage system.

Clause 16. The system of clause 15, wherein the separator can have a second outlet for discharge of water separated from the first stream Clause 17. The system of clause 15 or 16 can further include: a valve between the second inlet and the second outlet of the heat exchanger; a temperature sensor for sensing a temperature of the first stream between the outlet of the pressure reduction valve and the inlet of the separator; and a controller operative for controlling the valve to be in an open state for passage of at least part of the second stream therethrough or a closed state for blocking passage of the second stream therethrough based on temperature of the first stream determined via the temperature sensor.

Clause 18. The system of any of clauses 15-17, wherein in response to the controller determining via the temperature sensor that the temperature of the first stream is above a predetermined temperature, the controller can cause the valve to be in the closed state, whereupon the second stream flows through the second passage of the heat exchanger extracting heat from the first stream flowing in the first passage of the heat exchanger.

Clause 19. The system of any of clauses 15-18, wherein in response to the controller determining via the temperature sensor that the temperature of the first stream is at or below a predetermined temperature, the controller can cause the valve to be in the open state, whereupon at least part of the second stream flows through the valve bypassing the second passage of the heat exchanger.

Clause 20. The system of any of clauses 15-19, wherein the first stream can include a freezing inhibitor.

BRIEF DESCRIPTION OF THE DRAWING(S)

DESCRIPTION OF THE INVENTION

Figure 1:
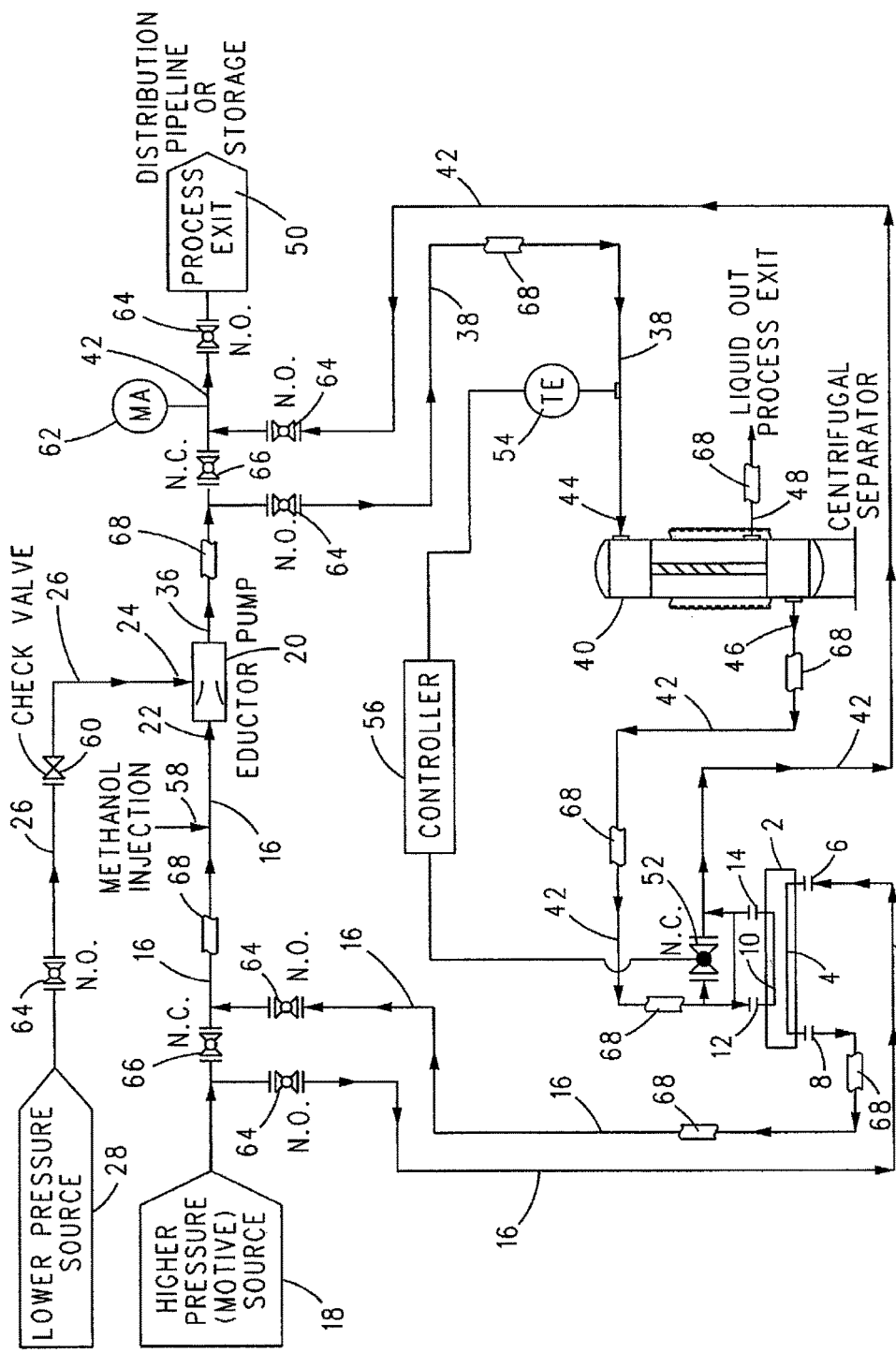
FIG. 1 is an example natural gas dehydration system that includes an eductor pump for mixing natural gas from a higher pressure (motive) source and a lower pressure source.

The following examples will be described with reference to the accompanying figures where like reference numbers correspond to like or functionally equivalent elements.

An example natural gas dehydration system includes a heat exchanger 2 having a first passage 4 defining a first inlet 6 in the first outlet 8. Heat exchanger 2 also includes a second passage 10 defining a second inlet 12 and a second outlet 14. Heat exchanger 2 is configured such that first and second passages 4, 10 are in thermal communication with each other and are fluidly isolated from each other. In an example, fluid flowing from second inlet 12 to second outlet 14 of second passage 10 can run in a counter-direction to fluid flowing from first inlet 6 to first outlet 8 of first passage 4. However, this is not to be construed in a limiting sense.

First inlet 6 is coupled to receive a first stream 16 of natural gas and water vapor, (i.e., the natural gas is entrained with water vapor) having a first temperature and a first pressure from a first, higher pressure (motive) source 18.

Figure 2:
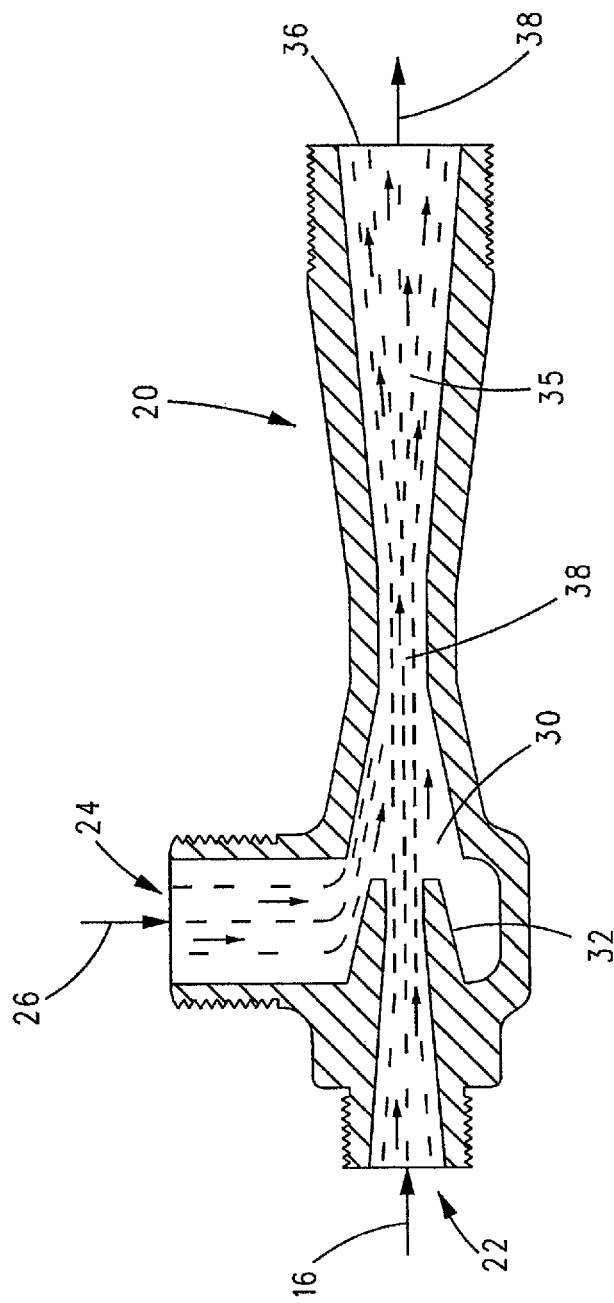
FIG. 2 is a cross-section of the eductor pump of FIG. 1.

With reference to FIG. 2 and with continuing reference to FIG. 1, an eductor pump 20 includes a first inlet 22 coupled to receive the first stream 16 from the first outlet 8 of heat exchanger 2 and a second inlet 24 coupled to receive a second stream 26 of natural gas and water vapor from a second, lower pressure source 28.

In an example, the first (motive) source 18 can be a high pressure natural gas well, for example, a new or relatively new gas well, having a nominal pressure output between 1,000-1,400 Pounds per Square Inch Gauge (PSIG), between 1,000-3,500 PSIG., or between 1,000-5,500 PSIG. In an example, second source 28 can be a natural gas well having a nominal pressure between 200-600 PSIG. In an example, second source 28 can be a natural gas well that has been producing natural gas for an extended interval of time such that the output pressure of the natural gas produced by second source 28 has decreased to between nominally 200-600 PSIG. These values of pressure for first (motive) source 18 and second source 28 are for illustration purposes only and are not to be construed in a limiting sense since it is envisioned that first (motive) source and/or second source can have other nominal pressures.

Returning now to the discussion of eductor pump 20, eductor pump 20 is operative for combining first stream 16 and second stream 26 in a mixing chamber 30 of eductor pump 20 after passage of first stream 16 through a nozzle 32 which increases the velocity of the first stream 16 while simultaneously producing an area of low pressure at the exit of nozzle 32 into mixing chamber 30. This area of low pressure at the exit of nozzle 32 sucks or pulls second stream 26 into mixing chamber 30 where first stream 16 and second stream 26 are combined to form a third stream 38 of natural gas and water vapor. This third stream 38 passes through eductor pump 20 which further combines and mixes first and second stream 16, 26. Third stream 38 passes through nozzle 35 of eductor pump 20 which decreases the velocity of third stream 38 and decreases the temperature of third stream 38 at an outlet 36 of eductor pump 20 to a third temperature less than the first temperature and a third pressure less than the first pressure. Depending on the third temperature of third stream 38, the water in third stream 38 can be in the form of water vapor, or condensed water, or both With ongoing reference to FIG. 1, the natural gas dehydration system further includes a separator 40 for separating at least part of the water vapor and/or condensed water from the third stream 38 to form a fourth stream 42 of (at least partially dehydrated) natural gas and water vapor having less water content than third stream 38. In an example, separator 40 can be a centrifugal separator. Examples of centrifugal separators include the Mueller KLS-1C Separator, available from Mueller Environmental Designs, Inc. of Brookshire, Tex. and the PECO Series 95 SV Scrubber, available from PECOFacet (US) Inc. of Mineral Wells, Tex. Example eductor pumps are commercially available from Fox Valve Development Corp. of Dover, N.J. and from Caltec Limited, Medway Court, Cranfield, Bedford, MK43 0FQ United Kingdom.

As shown in FIG. 1, separator 40 has an inlet 44 for receiving third stream 38 from outlet 36 of eductor pump 20. Separator 40 also includes a first outlet 46 where fourth stream 42 exits separator 40 and a second outlet 48 for discharge of water separated from third stream 38 by separator 40.

The fourth stream 42 output via first outlet 46 of separator 40 is supplied to second inlet 12 of heat exchanger 2. Second outlet 14 of heat exchanger 2 is coupled to a process exit 50, such as, for example, a natural gas distribution pipeline or a natural gas storage system.

A valve 52 can be coupled between second inlet 12 and second outlet 14 of heat exchanger 2 and a temperature sensor 54 can be positioned and operative for sensing the third temperature of third stream 38. A controller 56 can be coupled to receive the output of temperature sensor 54 and can be operative for controlling valve 52 to be in an open state for passage of at least part of fourth stream 42 therethrough or a closed state for blocking passage of at least part of fourth stream 42 therethrough based on the third temperature of third stream 38 determined via a temperature sensor 54.

The operation of the example natural gas dehydration system shown in FIG. 1 will now be described.

Initially, after exiting first passage 4 of heat exchanger 2, first stream 16 of natural gas and water vapor is mixed with second stream 26 of natural gas and water vapor by eductor pump 20 to form third stream 38 of natural gas and water vapor.

As third stream 38 passes through nozzle 35 and outlet 36 of eductor pump 20, the pressure and temperature of third stream 38 are reduced to values less than the pressure and temperature of first stream 16.

Third stream 38 exiting outlet 36 of eductor pump 20 enters separator 40 via inlet 44. Within separator 40, at least part of the water vapor entrained in third stream 38 and/or water condensed from third stream 38 is separated from third stream 38 to form fourth stream 42 of (at least partially dehydrated) natural gas and water vapor having a lower water content than third stream 38.

In response to controller 56 determining via temperature sensor 54 that the third temperature of third stream 38 entering inlet 44 of separator 40 is above a predetermined temperature programmed into controller 56, controller 56 causes valve 52 to be in its closed state, whereupon fourth stream 44 flows through second passage 10 of heat exchanger 2 extracting heat from first stream 16 flowing in first passage 4 of heat exchanger 2. This extraction of heat from first stream 16 lowers the temperature of first stream 16 between first inlet 6 and first outlet 8 of heat exchanger 2. Simultaneously, the temperature of fourth stream 44 exiting second outlet 14 of heat exchanger 2 is increased.

Reducing the temperature of first stream 16 exiting first outlet 8 of heat exchanger 2 results in the temperature of third stream 38 also being reduced, in an example, to ≤the dew point of water comprising third stream 38.

In an example, the net effect of the operation of the example natural gas dehydration system shown in FIG. 1 is to reduce the temperature of third stream 38 to facilitate extraction of at least part of the water comprising third stream 38 by separator 40. In an example, the predetermined temperature programmed in controller 56 can be ≤the dew point of water in third stream 38. However, this is not to be construed in a limiting sense since it is envisioned that the predetermined temperature programmed into controller 56 can be any temperature deemed suitable and/or desirable by one of ordinary skill in the art that facilitates separator 40 separating at least part of the water entrained in third stream 38 or condensed from third stream 38 to form fourth stream 42.

In an example, the feedback control provided by valve 52, temperature sensor 54 and controller 56, enables the temperature of first stream 16 exiting first outlet 8 of heat exchanger 2 to be reduced sufficiently such that the temperature of third stream 38 can be at or below the dew point of the water vapor comprising third stream 38, whereupon, in an example, third stream 38 can comprise liquid water. In response to controller 56 determining via temperature sensor 54 that the third temperature of third stream 38 is below the predetermined temperature discussed above, controller 56 can cause valve 52 to be in an open state, whereupon at least part of fourth stream 42 flows through valve 52, bypassing second passage 10 of heat exchanger 2, whereupon the heat extracted from first stream 16 in first passage 4 is reduced or eliminated over the heat that is extracted when valve 52 is in its closed state and the entirety of fourth stream 42 flows through second passage 10 of heat exchanger 2. As can be understood, controlling valve 52 between its open state and closed state enables the temperature of third stream 38 to be controlled.

Herein, it is to be understood that each stream of natural gas and water vapor 16, 26, 38, and 42 flows in a high-pressure sealed piping system that is not specifically shown for the purpose of simplicity.

In an example, the system can include an optional port 58 for injection of an optional freezing inhibitor, such as, for example, methanol, into first stream 16 to inhibit freezing of water vapor and to inhibit hydrate formation.

The path of second stream 26 can include a check valve 60 positioned to avoid back flow of natural gas and water vapor from second inlet 24 of eductor pump 20 to second pressure source 28. The system can also include a moisture analyzer 62 for validation of the water content in fourth stream 42 exiting process exit 50 to a distribution pipeline or storage system. Finally, the system can include a number of normally open (N.O.) and normally closed (N.C.) valves 64 and 66 strategically placed to facilitate process control, such as, for example, directing third stream 38 directly to process exit 50, bypassing heat exchanger 2, separator 40, and the attendant piping. If desired, certain lengths of the piping comprising the natural gas dehydration system shown in FIG. 1 can include insulation 68. However, this is not to be construed in a limiting sense.

Figure 3:
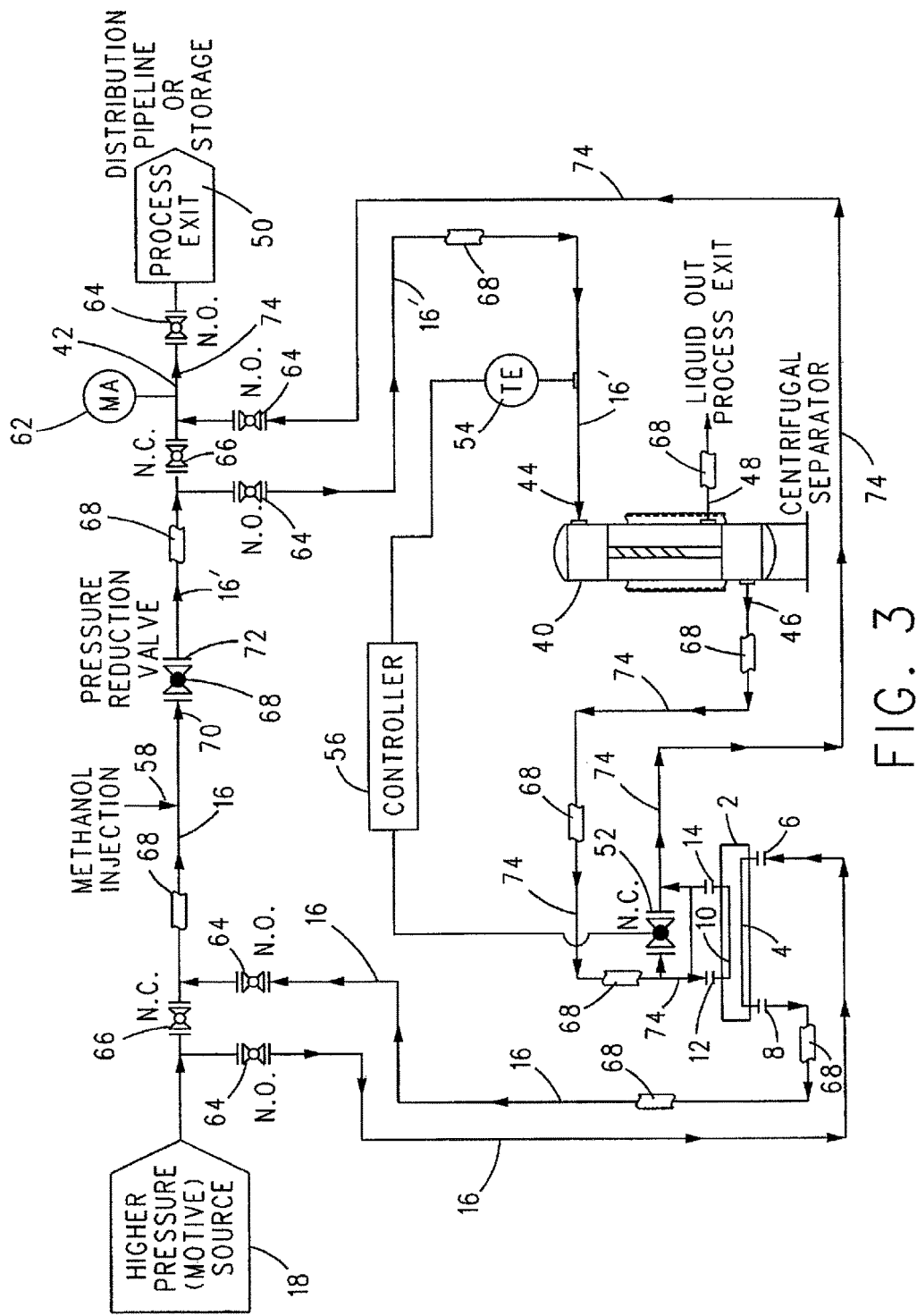
FIG. 3 is an example natural gas dehydration system that includes a pressure reduction valve.

With reference to FIG. 3, another example natural gas dehydration system is similar in most respects to the example natural gas dehydration system shown in FIG. 1 with the following exceptions. The second example natural gas dehydration system shown in FIG. 3 replaces eductor pump 20 (in FIG. 1) with a pressure-reduction valve 68 that has a single input 70 and a single output 72. Accordingly, the example natural gas dehydration system shown in FIG. 3 does not include second pressure source 28, second stream 26, and any piping or other elements used to convey second stream 26 to second inlet 24 of eductor pump 20.

A method of operating the natural gas dehydration system shown in FIG. 3 will now be described.

After passage through first passage 4 of heat exchanger 2, first stream 16 passes between input 70 and output 72 of pressure reduction valve 68 which forms a reduced pressure and reduced temperature first stream 16' that can include water vapor, condensed water, or both. This reduced temperature and pressure first stream 16' flows to inlet 44 of separator 40 which operates in the manner described above for separating at least part of the water from first stream 16' to form a second stream 74 of (at least partially dehydrated) natural gas and water vapor having a lower water content than first stream 16' and for outputting second stream 74 via first outlet 46 of separator 40 to second inlet 12 of heat exchanger 2.

In response to controller 56 determining via temperature sensor 54 that a temperature of first stream 16' entering inlet 44 of separator 40 is above the predetermined temperature discussed above, controller 56 causes valve 52 to be in its closed state, whereupon second stream 74 flows through second passage 10 of heat exchanger 2 extracting heat from first stream 16 flowing in first passage 4 of heat exchanger 2.

The purpose of extracting heat from first stream 16 flowing in first passage 4 of heat exchanger 2 is to also reduce the temperature of first stream 16', in an example, to ≤the dew point of water of first stream 16'.

In contrast, in response to controller 56 determining via temperature sensor 54 that the temperature of first stream 16' is below the predetermined temperature discussed above, controller 56 causes valve 52 to be in the open state, whereupon at least part of second stream 74 flows through valve 52 bypassing second passage 10 of heat exchanger 2, whereupon the heat extracted from first stream 16 in first passage 4 is reduced or eliminated over the heat that is extracted when valve 52 is in its closed state and the entirety of second stream 74 flows through second passage 10 of heat exchanger 2.

The operation of valve 52, temperature sensor 54, and controller 56 described above enables the temperature of first stream 16' to be decreased, in an example, to ≤the dew point of water in first stream 16' entering separator 40 which is more effective at separating condensed water from first stream 16'.

Pressure reduction valve 68 can be any suitable and/or desirable pressure reduction valve that enables the pressure and temperature of first stream 16 to be reduced to produce first stream 16' at the output of pressure reduction valve 68. In an example, optional port 58 can be provided for injection of a freezing inhibitor, such as methanol, into first stream 16 prior to input 70 of pressure reduction valve 68 to inhibit freezing of water and inhibit hydrate formation.

The example gas dehydration systems disclosed herein enable the effective removal of water vapor from natural gas extracted from the ground in a manner that minimizes or avoids the need to use external energy for the dehydration process.

The examples have been described with reference to the accompanying FIGS. Modifications and alterations will occur to others upon reading and understanding the foregoing examples. Accordingly, the foregoing examples are not to be construed as limiting the disclosure.

The invention claimed is:

1. A natural gas dehydration method comprising:
    (a) reducing a pressure and a temperature of a first stream of natural gas and water vapor;
    (b) separating at least part of the water vapor from the first stream of step (a) to form a second stream of natural gas and water vapor with a lower water vapor content than the first stream;
    (c) determining, by a temperature sensor, when a temperature of the first stream of step (a) is above a predetermined temperature, and causing the second stream to extract heat from the first stream prior to step (a); and
    (d) following step (c), causing the second stream to flow to a distribution pipeline or a storage system.

2. The method of claim 1, wherein step (c) includes:
    when a temperature of the first stream of step (a) determined by the temperature sensor is below the predetermined temperature, causing at least part of the second stream to flow to the distribution pipeline or the storage system without extracting heat from the first stream prior to step (a).

3. The method of claim 1, wherein the predetermined temperature is a dew point temperature of the water vapor in the first stream of step (a).

4. The method of claim 1, wherein the first stream of step (a) includes a freezing inhibitor.

5. A natural gas dehydration method comprising:
    (a) mixing a first stream of natural gas and water vapor having a first pressure and a first temperature with a second stream of natural gas and water vapor having a second, lower pressure than the first pressure and a second temperature to form a third stream of natural gas and water vapor;
    (b) reducing a pressure and a temperature of the third stream of step (a);
    (c) separating at least part of the water vapor from the third stream of step (b) to form a fourth stream of natural gas and water vapor having a lower water vapor content than the third stream;
    (d) in response to a temperature of the third stream being above a predetermined temperature, causing the fourth stream to extract heat from the first stream prior to step (a); and
    (e) following step (e), causing the fourth stream to flow to a distribution pipeline or a storage system.

6. The method of claim 5, wherein step (d) includes:
    in response to the temperature of the third stream being at or below the predetermined temperature, causing at least part of the fourth stream to flow to the distribution pipeline or the storage system without extracting heat from the first stream prior to step (a).

7. The method of claim 5, wherein the predetermined temperature is a dew point temperature of the water vapor in the third stream.

8. The method of claim 5, wherein the first stream of step (a) includes a freezing inhibitor.

* * * * *

UNITED STATES PATENT AND TRADEMARK OFFICE
CERTIFICATE OF CORRECTION

PATENT NO. : 10,301,565 B2
APPLICATION NO. : 15/156624
DATED : May 28, 2019
INVENTOR(S) : Douglas K. Mace Page 1 of 1

It is certified that error appears in the above-identified patent and that said Letters Patent is hereby corrected as shown below:

On the Title Page

Item (71), Line 1, delete "Eguitrans" and insert -- Equitrans --

Signed and Sealed this
Twenty-seventh Day of August, 2019

Andrei Iancu
*Director of the United States Patent and Trademark Office*